(12) United States Patent
Maity et al.

(10) Patent No.: US 7,750,646 B2
(45) Date of Patent: Jul. 6, 2010

(54) DETECTOR FOR PRECURSIVE DETECTION OF ELECTRICAL ARC

(75) Inventors: Sandip Maity, Karnataka (IN); Ayan Banerjee, Karnataka (IN)

(73) Assignee: General Electric Company, Niskayuna, NY (US)

( * ) Notice: Subject to any disclaimer, the term of this patent is extended or adjusted under 35 U.S.C. 154(b) by 182 days.

(21) Appl. No.: 11/972,033

(22) Filed: Jan. 10, 2008

(65) Prior Publication Data

US 2009/0180233 A1 Jul. 16, 2009

(51) Int. Cl.
*G01R 31/08* (2006.01)
(52) U.S. Cl. .............................. 324/536; 702/57; 702/60
(58) Field of Classification Search ................... 324/536
See application file for complete search history.

(56) References Cited

U.S. PATENT DOCUMENTS

| 5,680,059 | A | | 10/1997 | Shiota et al. | |
|---|---|---|---|---|---|
| 5,982,181 | A | * | 11/1999 | Rokunohe et al. | 324/551 |
| 6,255,808 | B1 | | 7/2001 | Hücker | |
| 6,300,767 | B1 | * | 10/2001 | Kliman et al. | 324/536 |
| 6,301,306 | B1 | * | 10/2001 | McDonald et al. | 375/259 |
| 6,332,961 | B1 | * | 12/2001 | Johnson et al. | 204/192.13 |
| 7,305,311 | B2 | * | 12/2007 | van Zyl | 702/57 |
| 2002/0079906 | A1 | | 6/2002 | Rashkes et al. | |
| 2002/0163344 | A1 | * | 11/2002 | Rokunohe et al. | 324/551 |
| 2005/0017732 | A1 | * | 1/2005 | Kim et al. | 324/536 |
| 2005/0035768 | A1 | | 2/2005 | Rabach et al. | |
| 2005/0104616 | A1 | * | 5/2005 | Cullen et al. | 324/772 |
| 2006/0241879 | A1 | * | 10/2006 | van Zyl | 702/60 |
| 2008/0024140 | A1 | * | 1/2008 | Henson et al. | 324/536 |

FOREIGN PATENT DOCUMENTS

| JP | 2002002952 A | 1/2002 |
|---|---|---|
| JP | 2002071742 A | 3/2002 |
| JP | 2003043096 A | 2/2003 |
| JP | 2003114250 A | 4/2003 |
| JP | 2003307539 A | 10/2003 |
| JP | 2006300812 A | 11/2006 |

* cited by examiner

*Primary Examiner*—Timothy J Dole
*Assistant Examiner*—Benjamin M Baldridge
(74) *Attorney, Agent, or Firm*—Richard D. Emery

(57) ABSTRACT

A detector system for precursively identifying an electrical arcing event is provided. The system may include a transmission channel for transmitting a radio frequency signal to a zone where an arcing event may occur. The system may further include a reception channel for receiving a radio frequency signal resulting from an interaction of the transmitted radio frequency signal and an electric field which forms at the zone as a precursor to an arcing event. A pre-arc identification circuit may be coupled to process the resulting radio frequency signal. The identification circuit may be configured to generate a signal indicative of a pre-arc condition based on at least one parameter of the resulting radio frequency signal.

22 Claims, 2 Drawing Sheets

DETECTOR FOR PRECURSIVE DETECTION OF ELECTRICAL ARC

FIELD OF THE INVENTION

Aspects of the present invention are generally related to detection of electrical arcing, and, more particularly, to a radio frequency (RF)-based system for precursive detection of an electrical arc.

BACKGROUND OF THE INVENTION

Early and accurate identification of an electric arcing event is an important first step in mitigating undesirable and/or dangerous electrical arcing conditions that may develop in electrical equipment. Known electrical arc detectors have been generally directed to post arc-discharge detection. That is, directed to detection subsequent to the formation and discharge of an electrical arc. For example, one known technique for detecting arcing events is to use optical detectors to sense the arc flash associated with an arcing discharge. However, such detectors are usually limited to line of sight detection and must be positioned relatively close to a potential source of an arc. Another technique is to use current monitors to evaluate current perturbations in a conductor indicative of an arcing event. However, this technique may require burdensome processing demands resulting in an undesirably long reaction time for identifying an arcing event. Improved detection directed to pre-arcing conditions is desired to pre-empt the occurrence of an arcing event.

BRIEF SUMMARY OF THE INVENTION

Generally, aspects of the present invention provide a detector system for precursively identifying an electrical arcing event. The system may include a transmission channel for transmitting a radio frequency signal to a zone where an arcing event may occur. The system may further include a reception channel for receiving a radio frequency signal resulting from an interaction of the transmitted radio frequency signal and an electric field which forms at the zone as a precursor to an arcing event. A pre-arc identification circuit may be coupled to process the resulting radio frequency signal. The identification circuit may be configured to generate a signal indicative of a pre-arc condition based on at least one parameter of the resulting radio frequency signal.

Further aspects of the present invention provide an array detector for precursively locating an electrical arcing event at any one of a plurality of spaced apart zones where a respective arcing event may occur. The array detector may include a plurality of transmission channels each for transmitting a respective radio frequency signal. Each channel may transmit a signal having at least one distinctive signal characteristic relative to the signals transmitted by the other channels. Each distinctive signal characteristic may be associated with a respective one of the plurality of zones where an arcing event may occur. The array detector may further include a plurality of reception channels each for receiving a respective radio frequency signal. Each channel may receive a signal resulting from an interaction of each respective radio frequency signal having at least one distinctive signal characteristic and the electric field which forms at a respective zone as a precursor to an arcing event at that respective zone. A pre-arc identification circuit may be coupled to receive each resulting radio frequency signal. The identification circuit may be configured to generate a signal indicative of a pre-arc condition at a respective one of the plurality of zones based at least on one parameter of the resulting radio frequency signal and further based on at least one distinctive signal characteristic associated with the respective one of the plurality of zones.

Still further aspects of the present invention provide a detector system for precursively identifying an electrical arcing event. The system may include a modulator for transmitting a modulated radio frequency signal to a zone where an arcing event may occur. The system may further include a demodulator for receiving a radio frequency signal resulting from an interaction of the modulated signal and an electric field which forms at the zone as a precursor to an arcing event. A pre-arc identification circuit may be coupled to process the resulting radio frequency signal. The identification circuit may be configured to generate a signal indicative of a pre-arc condition based on at least one parameter of the resulting radio frequency signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The inventors of the present invention have innovatively recognized a radio frequency (RF)-based system for precursive (e.g., anticipatory) detection of an electrical arc discharge, such as may be used for pre arc-discharge detection across current-carrying conductors. That is, such a precursive detection system is directed to detection prior to a discharge of an electrical arc. Accordingly, the expression pre-arc event identification or detection refers to detection prior to occurrence of a discharge of an electrical arc. In accordance with aspects of the invention, such a discharge may be advantageously pre-empted by taking appropriate control measures upon a pre-arc detection.

Figure 1:
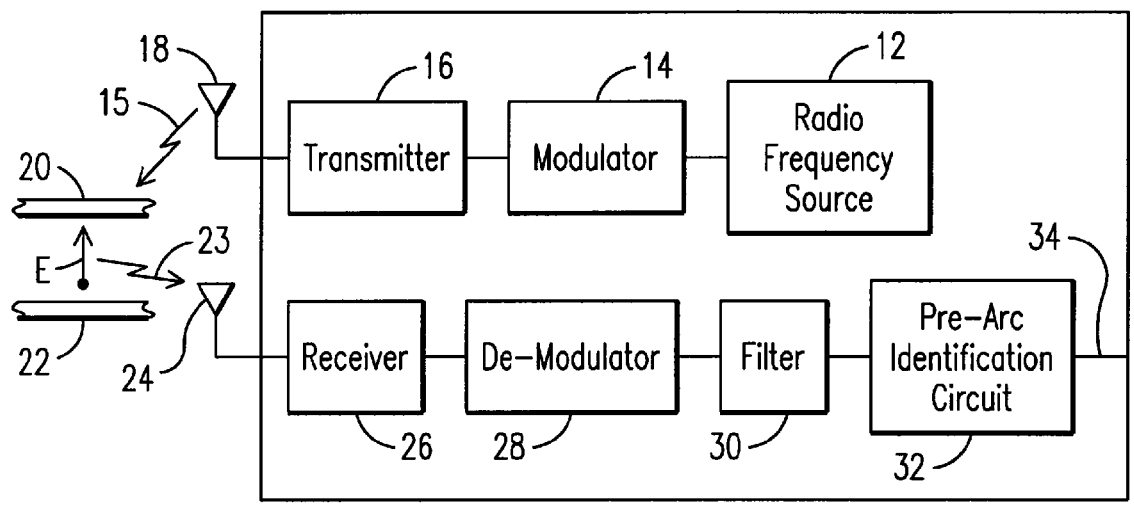
FIG. 1 is a schematic diagram illustrating an example embodiment of a detector system for identifying an arcing event, such as may occur in electrical distribution equipment.
Figure 2:
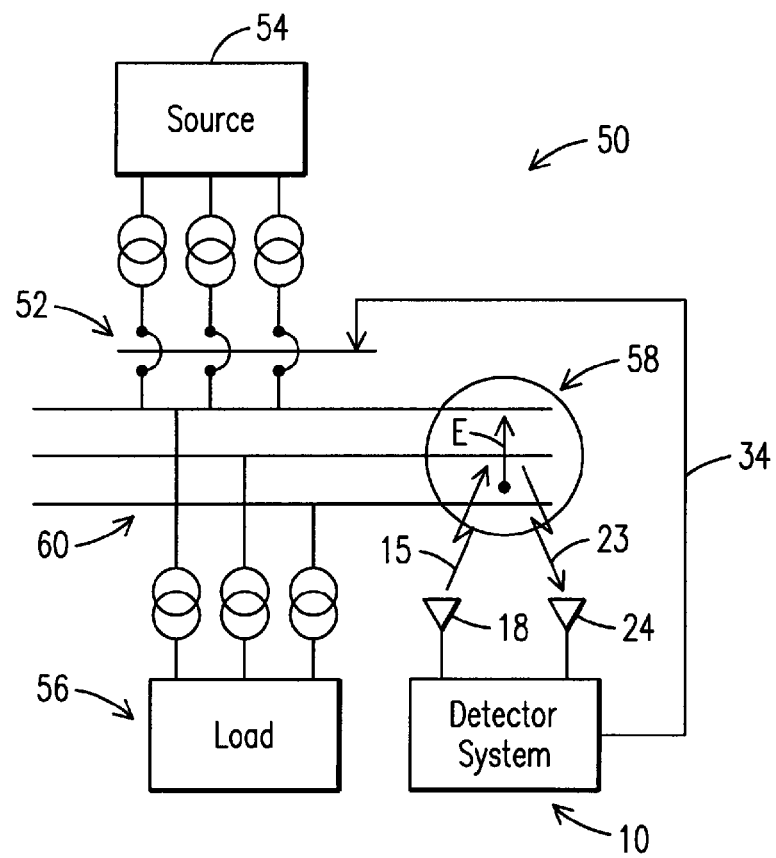
FIG. 2 is an example electrical distribution equipment environment in which the system of FIG. 1 may be used.

FIG. 1 is a schematic diagram illustrating an example embodiment of a detector system 10 for identifying a pre-arcing event, such as may occur in electrical distribution equipment. An example embodiment of an electrical distribution equipment that may benefit from aspects of the present invention is depicted in FIG. 2.

In one example embodiment, detector system 10 is based on radio frequency (RF) signals, and may include a transmission channel and a reception channel. A transmission channel may include an RF source 12 coupled to a modulator 14. For example, modulator 14 may be an amplitude-modulator configured to generate an amplitude-modulated (AM) signal 15 to be transmitted by a transmitter 16 through a transmitting antenna 18 to a zone where an arcing event could occur, such as across electrical conductors 20 and 22. By way of example, conductors 20 and 22 may represent conductors in a high-voltage transmission line, busbar conductors in a circuit breaker, etc.

The inventors of the present invention have observed that prior to the occurrence of an arcing event, a precursor electric field E (e.g., in the order of approximately 3 KV/cm or higher) forms across conductors 20 and 22. The magnitude of this electric field can rapidly grow and this growth would eventually lead to an arcing event, (e.g., electrical arc discharge). However, in accordance with aspects of the present invention, effects of this precursor electric field E may be used as an indicator to take appropriate pre-emptive action prior to occurrence of an electrical arc discharge.

Figure 4:
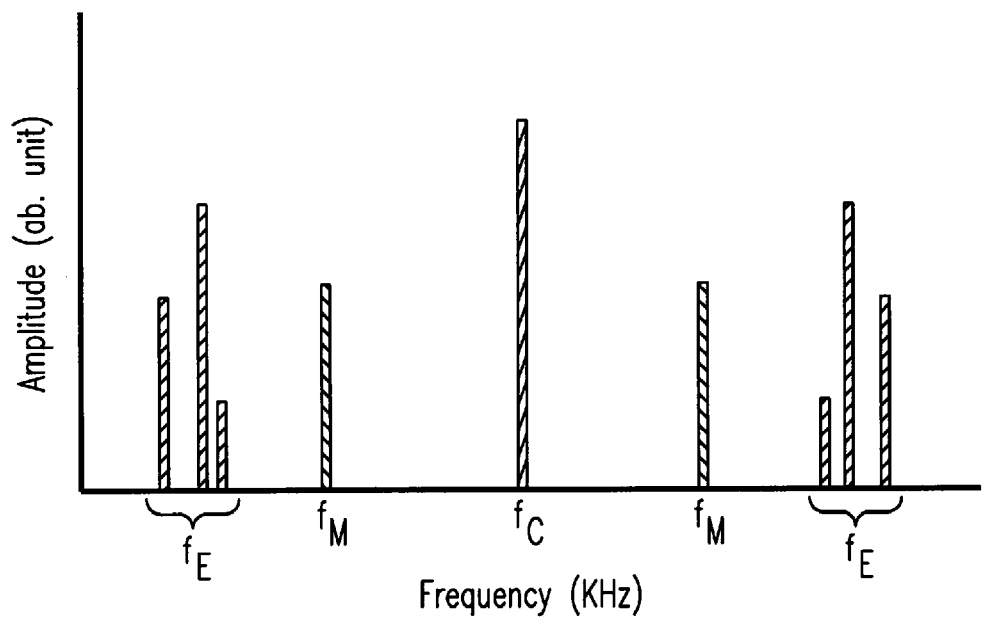
FIG. 4 is an example frequency spectrum associated with a signal used by the detector system of FIG. 1 for precursive detection of an arcing event.

In one example embodiment, the effects of the electric field E that forms across conductors 20 and 22, would cause a change in the amplitude of the modulated signal emitted from antenna 18. A reception channel may include a receiving antenna 24 coupled to a receiver 26 to receive the modulated signal being affected by electric field E across conductors 20 and 22 (e.g., signal 23). Receiver 26 is in turn coupled to a demodulator 28 to supply a signal that may be demodulated at the carrier frequency. As shown in FIG. 4, it has been observed that, in addition to the frequency spectrum normally associated with an amplitude modulated signal, such as lower and upper frequency side-bands ($f_M$) relative to the carrier signal ($f_C$), electric field-induced frequency sidebands ($f_E$) are formed due to the interaction of the precursor electric field E with the modulated signal from antenna 18.

The output from demodulator 28 may be optionally coupled to a suitable filter 30 to appropriately isolate the electric field-induced frequency sidebands and measure one or more parameters of sidebands $f_E$, e.g., power spectral content, peak amplitude level, etc. In one example embodiment, filter 30 may be a notch filter configured to attenuate the carrier frequency and to allow just the electric field induced side bands $f_E$. In another example embodiment, filter 30 may be a high-pass filter configured to pass electric field-induced frequency sidebands $f_E$. The output from filter 30 may be coupled to a pre-arc identification circuit 32. In one example embodiment, pre-arc identification circuit 32 may operate in the time domain and may be configured to generate a signal 34 indicative of a pre-arcing event in response to a time-domain analysis. For example, pre-arc identification circuit 32 may include a comparator for comparing the amplitude of the demodulated signal against a threshold value. In the event the amplitude of the demodulated signal exceeds the threshold value, then pre-arc identification circuit 32 would generate signal 34 indicative of the pre-arcing event.

In another example embodiment, pre-arc identification circuit 32 may operate in the frequency domain to generate signal 34 indicative of the pre-arc event in response to analysis in the frequency domain. For example, pre-arc identification circuit 32 may include a comparator for comparing the respective peak amplitude of the electric-field induced sidebands $f_E$ against a threshold value or may include a device for measuring spectral power content in the electric-field induced sidebands $f_E$. Regardless of the specific nature of the analysis for triggering signal 34, this signal may be used to control an operation of an electrical distribution equipment 50 (FIG. 2). For example, signal 34 may be used to open a circuit breaker 52 to disconnect an electrical power source 54 from an electrical load 56 responsive to a pre-arc event 58 occurring relative to a bus bar 60. It is noted that amplitude modulation constitutes just an example for sensing an effect of the precursor electric field E to generate an indication of a pre-arc event. It should be appreciated, however, that aspects of the present invention are not limited to amplitude modulation. One skilled in the art will now appreciate that other modulations techniques, such as frequency modulation, may be used for sensing an effect of the precursor electric field E to generate an indication of a pre-arc event.

Figure 3:
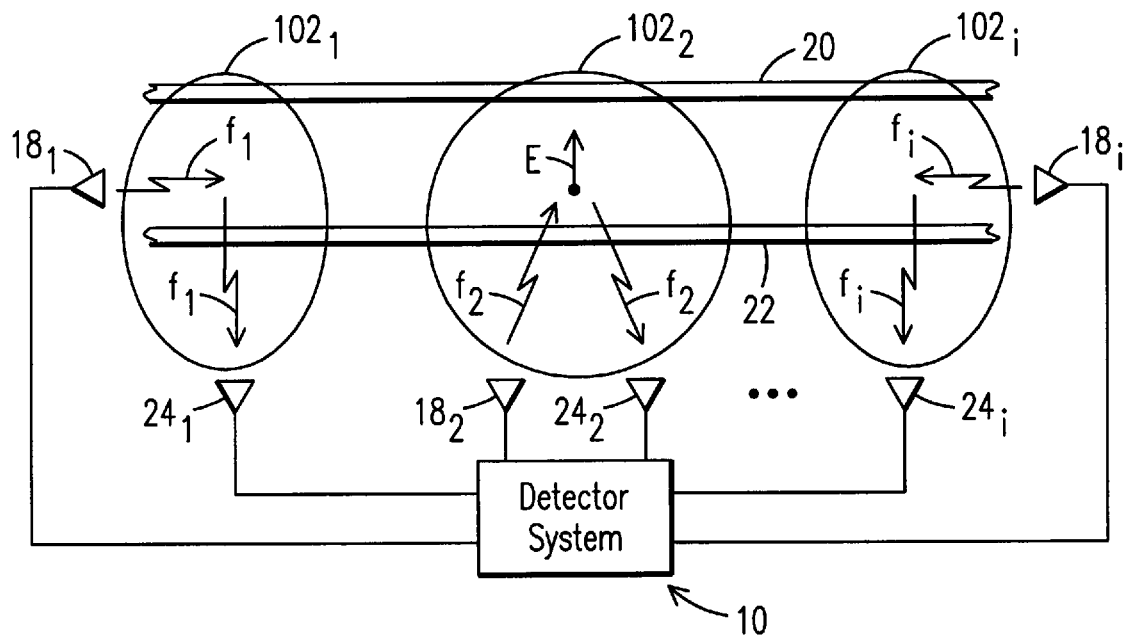
FIG. 3 is a schematic representation of an example embodiment of an array detector system for identifying an arcing event along any of a plurality of arcing zones.

FIG. 3 is a schematic representation of an example embodiment of a system 100 based on a detector array for identifying an arcing event along any of a plurality of arcing zones $102_1$, $102_2$, . . . $102_i$ along conductors 22 and 24 as may be spaced over an extended length of the conductors. In one example embodiment, detector array system 100 may include a plurality of detector channels as described above (e.g., antennae, modulator/demodulator channels) each operating at distinctive carrier frequencies, $f_1, f_2, \ldots f_i$. These carrier frequencies may be selected sufficiently apart from one another so that the spectral ranges of the respective modulator output signals do not overlap with one another. This separation in frequency would allow to determine with a common pre-arc identification circuit the specific arcing zone of the plurality of arcing zones that may be experiencing a pre-arcing event. For example, if in zone $102_2$ a precursor electric field E is formed, then the modulated signal affected by electric field E in zone $102_2$ would be demodulated at carrier frequency $f_2$. As noted above, such carrier frequency is selected sufficiently apart from the other carrier frequencies $f_1 \ldots f_i$ so that the spectral range of the respective modulator output signal for zone $102_2$ (e.g., electric-field induced sidebands $f_E$) would be distinguishable from the spectral range for the other carrier frequencies.

In operation, a detector system embodying aspects of the present invention may be used for wireless, fast pre-arcing detection (e.g., within a few microseconds). The system may also be adapted for tracking a localization of any pre-arcing zone in a plurality of spaced apart pre-arcing zones.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A detector system for predicting an arcing event in electrical equipment, comprising:
   a transmission channel that transmits a radio frequency signal that is independent of energy associated with an arcing event to a zone where the arcing event may occur;
   a reception channel that receives a radio frequency signal resulting from an interaction of the transmitted radio frequency signal and an electric field which forms at the zone; and
   a pre-arc identification circuit that processes the resulting radio frequency signal, and detects, prior to arc formation, a pre-arc condition based on at least one parameter of the resulting radio frequency signal.

2. The detector system of claim 1 wherein the transmission channel includes a modulator.

3. The detector system of claim 2 wherein the modulator is selected from the group consisting of an amplitude modulator and a frequency modulator.

4. The detector system of claim 2 wherein the reception channel comprises a demodulator.

5. The detector system of claim 4 wherein the demodulator is selected from the group consisting of an amplitude demodulator and a frequency demodulator.

6. The detector system of claim 4 wherein the identification circuit comprises a comparator that compares in a time domain an amplitude of a signal demodulated by the demodulator relative to an amplitude threshold value, and, based on a result from the comparison, generates a signal indicative of the pre-arc condition.

7. The detector system of claim 4 wherein the identification circuit comprises a comparator that compares in a frequency domain a peak of a sideband frequency induced by the electric field in a signal demodulated by the demodulator relative to a peak threshold value, and based on a result from the comparison, generates a signal indicative of the pre-arc condition.

8. The detector system of claim 4 wherein the identification circuit comprises a device that measures spectral power of a sideband frequency induced by the electric field in a signal demodulated by the demodulator, and based on a result from the measurement, that generates signal indicative of the pre-arc condition.

9. An array detector for predicting arcing events in electrical equipment, comprising:
  a plurality of transmission channels, each of which transmits a respective radio frequency signal that is independent of energy associated with an arcing event, each channel transmitting a signal having at least one distinctive signal characteristic relative to the signals transmitted by the other channels, each distinctive signal characteristic associated with a respective one of a plurality of zones where an arcing event may occur;
  a plurality of reception channels, each of which receives a respective radio frequency signal, each channel receiving a signal resulting from an interaction of each respective radio frequency signal having at least one distinctive signal characteristic and the electric field which forms at a respective one of the plurality of zones; and
  a pre-arc identification circuit that receives each resulting radio frequency signal, and detects, prior to arc formation, a pre-arc condition at a respective one of the plurality of zones based at least on one parameter of the resulting radio frequency signal and further based on at least one distinctive signal characteristic associated with said respective one of the plurality of zones.

10. The array detector of claim 9 wherein each of the plurality of transmission channels comprises a modulator operating at a respectively distinctive carrier frequency.

11. The array detector of claim 10 wherein each modulator is selected from the group consisting of an amplitude modulator and a frequency modulator.

12. The array detector of claim 10 wherein each of the plurality of reception channels comprises a demodulator configured to demodulate at the respective distinctive carrier frequency.

13. The array detector of claim 12 wherein at least one of the demodulators is selected from the group consisting of an amplitude demodulator and a frequency demodulator.

14. The array detector of claim 12 wherein the identification circuit comprises a comparator that compares in a time domain an amplitude of a signal demodulated by the demodulator relative to an amplitude threshold value, and, based on a result from the comparison, generates a signal indicative of the pre-arc condition at a respective one of the plurality of zones.

15. The array detector of claim 14 wherein the identification circuit comprises a comparator that compares in a frequency domain a peak of a sideband frequency induced by the electric field in a signal demodulated by the demodulator relative to a peak threshold value, and based on a result from the comparison, generates a signal indicative of the pre-arc condition at a respective one of the plurality of zones.

16. The array detector of claim 14 wherein the identification circuit comprises a device that measures in a frequency domain spectral power of a sideband frequency induced by the electric field in a signal demodulated by the demodulation channel, and based on a result from the measurement, generates a signal indicative of the pre-arc condition at a respective one of the plurality of zones.

17. A detector system for predicting an arcing event in electrical equipment, comprising:
  a modulator that transmits a modulated radio frequency signal that is independent of energy associated with an arcing event to a zone where the arcing event may occur;
  a demodulator that receives a radio frequency signal resulting from an interaction of the modulated signal and an electric field which forms at the zone; and
  a pre-arc identification circuit that processes the resulting radio frequency signal, and detects, prior to arc formation, a pre-arc condition based on at least one parameter of the resulting radio frequency signal.

18. The detector system of claim 17 wherein the modulator is selected from the group consisting of an amplitude modulator and a frequency modulator.

19. The detector system of claim 18 wherein the demodulator is selected from the group consisting of an amplitude demodulator and a frequency demodulator.

20. The detector system of claim 19 wherein the identification circuit comprises a comparator that compares in a time domain an amplitude of a signal demodulated by the demodulation channel relative to an amplitude threshold value, and, based on a result from the comparison, generates a signal indicative of the pre-arc condition.

21. The detector system of claim 19 wherein the identification circuit comprises a comparator that compares in a frequency domain a peak of a sideband frequency induced by the electric field in a signal demodulated by the demodulation channel relative to a peak threshold value, and based on a result from the comparison, generates a signal indicative of the pre-arc condition.

22. The detector system of claim 19 wherein the identification circuit comprises a device that measures in a frequency domain spectral power of a sideband frequency induced by the electric field in a signal demodulated by the demodulation channel, and based on a result from the measurement, the device generates a signal indicative of the pre-arc condition.

* * * * *